United States Patent
McBee et al.

(10) Patent No.: US 7,591,484 B2
(45) Date of Patent: Sep. 22, 2009

(54) QUICK-CONNECT FITTING

(75) Inventors: Jeffrey W. McBee, Cincinnati, OH (US); Dean A. Berberich, Ft. Wright, KY (US); Mitra Thunga, Mason, OH (US)

(73) Assignee: Cincinnati Test Systems, Inc., Cleves, OH (US)

( * ) Notice: Subject to any disclaimer, the term of this patent is extended or adjusted under 35 U.S.C. 154(b) by 341 days.

(21) Appl. No.: 11/275,776

(22) Filed: Jan. 27, 2006

(65) Prior Publication Data

US 2007/0176414 A1    Aug. 2, 2007

(51) Int. Cl.
*F16L 17/00*    (2006.01)
(52) U.S. Cl. .................................................... 285/101
(58) Field of Classification Search ................. 285/89, 285/90, 33, 101, 106, 96
See application file for complete search history.

(56) References Cited

U.S. PATENT DOCUMENTS

| | | | |
|---|---|---|---|
| 2,080,271 A | 5/1937 | Hirst | |
| 2,819,733 A | 1/1958 | Maisch | |
| 2,962,096 A * | 11/1960 | Knox | ........................... 285/96 |
| 3,727,952 A | 4/1973 | Richardson | |
| 4,189,162 A | 2/1980 | Rasmussen et al. | |
| 4,225,159 A | 9/1980 | Van Meter | |
| 4,227,721 A | 10/1980 | Reedy et al. | |
| 4,326,407 A | 4/1982 | Van Meter et al. | |
| 4,345,783 A | 8/1982 | Bergstrand | |
| 4,527,817 A | 7/1985 | Persson | |
| 4,540,201 A | 9/1985 | Richardson | |
| 4,688,830 A | 8/1987 | Meisinger et al. | |
| 4,759,572 A | 7/1988 | Richardson | |
| 4,793,636 A | 12/1988 | Keck | |
| 4,869,300 A | 9/1989 | Gudenau et al. | |
| 4,884,830 A | 12/1989 | Meisinger | |
| 4,970,904 A | 11/1990 | Knotts | |
| 4,984,826 A | 1/1991 | Yokomatsu et al. | |
| 5,024,079 A | 6/1991 | Dufort | |
| 5,150,924 A | 9/1992 | Yokomatsu et al. | |
| 5,170,659 A | 12/1992 | Kemp | |
| RE34,715 E | 9/1994 | Gudenau et al. | |

(Continued)

OTHER PUBLICATIONS

[Online], [retrieved on Apr. 27, 2006] Retrieved from FasTest Inc. online general industry catalog using Internet <URL: http:/www.fastestinc.com/generalindustry/catalog.asp>.

*Primary Examiner*—Aaron M Dunwoody
(74) *Attorney, Agent, or Firm*—Wood Herron & Evans, LLP

(57) ABSTRACT

A fitting for sealing against the outer surface of an inlet includes a housing comprising a base and a closure defining a cavity within the housing. A resilient bushing is disposed within the cavity and is positioned between the closure and a piston slidably disposed in the cavity. The fitting has a first condition wherein the inlet can be received within an inner diameter of the bushing through an aperture in the closure. The fitting can be actuated to a second condition wherein the piston axially compresses the resilient bushing against the closure, thereby causing the inner diameter of the bushing to expand radially inwardly to sealingly engage the outer surface of the inlet. When the inlet is sealingly engaged by the resilient bushing in the second condition, fluid may be admitted to the inlet through a fluid passage in the housing.

14 Claims, 6 Drawing Sheets

U.S. PATENT DOCUMENTS

| | | |
|---|---|---|
| 5,439,258 A | 8/1995 | Yates |
| 5,507,537 A | 4/1996 | Meisinger et al. |
| 5,762,095 A | 6/1998 | Gapinski et al. |
| 5,789,707 A | 8/1998 | Damm et al. |
| 5,797,431 A | 8/1998 | Adams |
| 5,845,943 A | 12/1998 | Ramacier, Jr. et al. |
| 5,967,191 A | 10/1999 | Mummolo |
| 5,983,920 A | 11/1999 | Gapinski et al. |
| 6,035,898 A | 3/2000 | Dominquez |
| 6,367,313 B1 | 4/2002 | Lubyk |
| 6,467,336 B1 | 10/2002 | Gotowik |
| 6,471,254 B2 | 10/2002 | Russell |
| 6,502,864 B1 | 1/2003 | Savard |
| 6,543,780 B1 | 4/2003 | Kogler et al. |
| 6,588,805 B2 | 7/2003 | Persohn et al. |
| 6,675,634 B2 | 1/2004 | Berneski, Jr. et al. |
| 2005/0046180 A1 | 3/2005 | Tombler, Jr. et al. |

\* cited by examiner

QUICK-CONNECT FITTING

FIELD OF THE INVENTION

The present invention relates generally to fittings for connecting a fluid supply to an inlet, and more particularly to a quick-connect fitting configured to engage the outer surface of a pipe or conduit.

BACKGROUND OF THE INVENTION

Fittings that can be connected to and disconnected from pipes or conduits are useful for filling and leak testing various mechanical systems having a piping network or other configurations of passages adapted to transport fluids, such as refrigeration systems, hydraulic lines, automotive fuel rails and fuel lines, automotive intake and exhaust manifolds, and other systems. In other applications, fittings may be used to facilitate filling containers with fluid without leak testing the containers. When many containers are to be filled in succession, or when it is desired to leak test several fluid carrying systems, the fitting should be capable of quick and easy connection and disconnection, while maintaining good sealing integrity with the inlet end of the system or container.

Various quick-connect fittings are known in the art. Some of these fittings utilize collets or other clamping devices that can crimp, mar, or otherwise damage the surface of a pipe, conduit or other inlet structure to which the fitting is connected. Other fittings do not include locking mechanisms that prevent inadvertent loosening or disassembly of the fitting during test or fill conditions. Prior fittings which include locking mechanisms often utilize set screws or other devices in a manner that damages threads or other surface areas of the test fitting.

A need therefore exists for an improved fitting that overcomes these and other drawbacks of prior fluid fittings.

SUMMARY OF THE INVENTION

The present invention overcomes the foregoing and other shortcomings and drawbacks of fittings heretofore known for use in coupling to the outer surface of an inlet. While the invention will be described in connection with certain embodiments, it will be understood that the invention is not limited to these embodiments. On the contrary, the invention includes all alternatives, modifications and equivalents as may be included within the spirit and scope of the present invention.

In one aspect in accordance with the principles of the present invention, a fitting that can quickly and easily be coupled to the outer surface of an inlet to a pipe system or a container comprises a housing having a base and a closure. The closure is coupled to the base to define a cavity within the housing. A resilient bushing is disposed within the cavity and is positioned between the closure and a piston that is slidably disposed in the cavity. The fitting has a first state wherein the inlet can be received within an inner diameter of the bushing through an aperture in the closure. The fitting can be actuated to a second condition wherein the piston axially compresses the resilient bushing against the closure, thereby causing the inner diameter of the bushing to expand radially inwardly to sealingly engage the outer surface of the inlet. When the inlet is sealingly engaged by the resilient bushing in the second condition, fluid may be admitted to the inlet through a fluid passage in the housing.

In another aspect of the invention, the fitting includes a locking member configured to prevent inadvertent loosening of the closure with respect to the base. In one embodiment, the locking member includes a locking ring threadably coupled to the closure. The locking ring is adjustable on the closure to abut the base to prevent further movement of the closure relative to the base. In another embodiment, grooves are provided on the closure and the locking member comprises at least one set screw adjustably positioned within a threaded aperture on the base. When the closure is positioned at a desired location with respect to the base, the set screw may be aligned with one of the grooves and adjusted to engage the closure at the groove.

In another aspect of the invention, the fitting includes a protective cover extending over at least a portion of the closure to protect the cover and inlet from inadvertent contact.

These and other features, advantages, and objectives of the invention will become more readily apparent to those of ordinary skill in the art upon review of the following detailed description of the exemplary embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
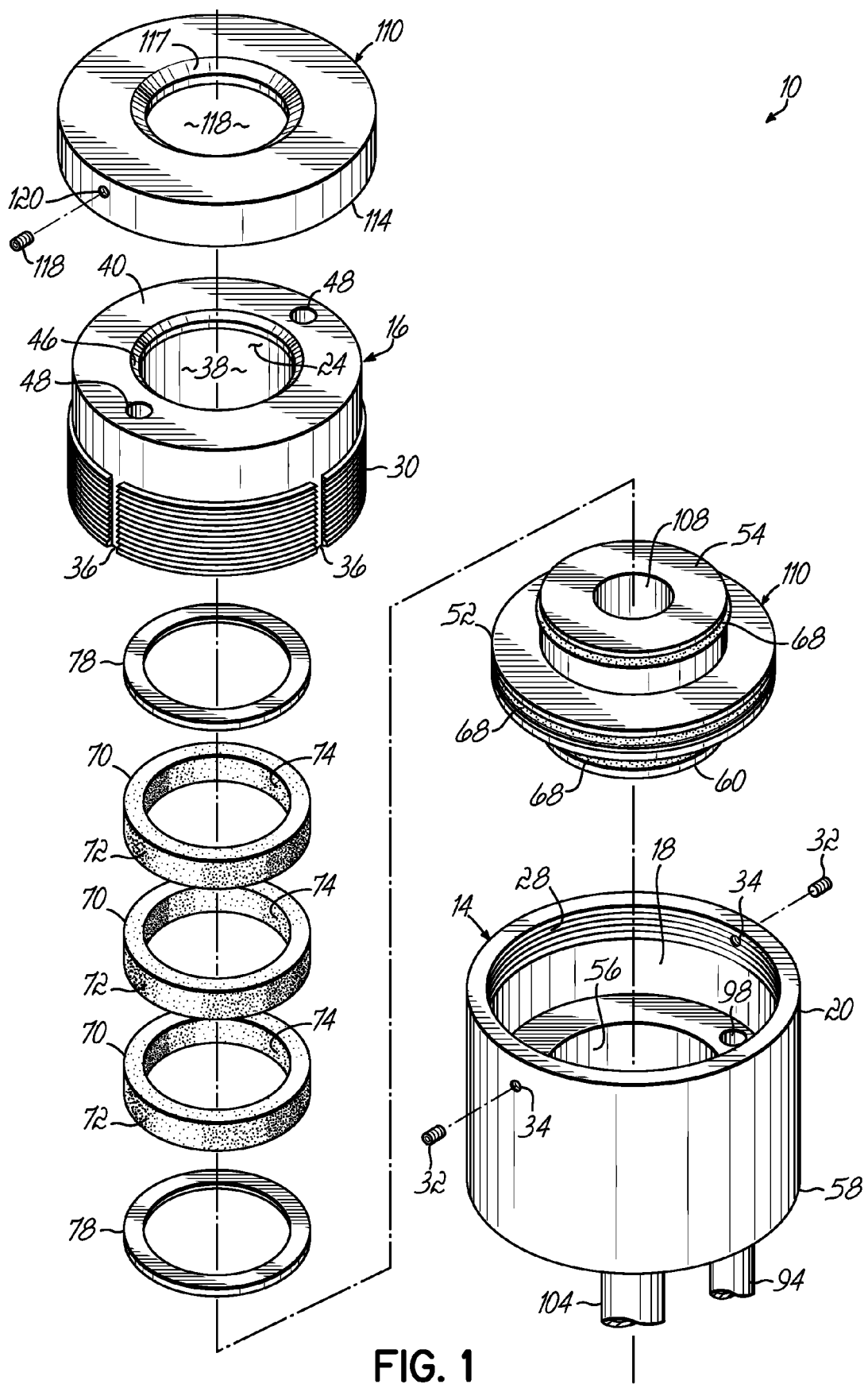
FIG. 1 is an exploded perspective view of an exemplary fitting in accordance with the principles of the present invention.
Figure 2:
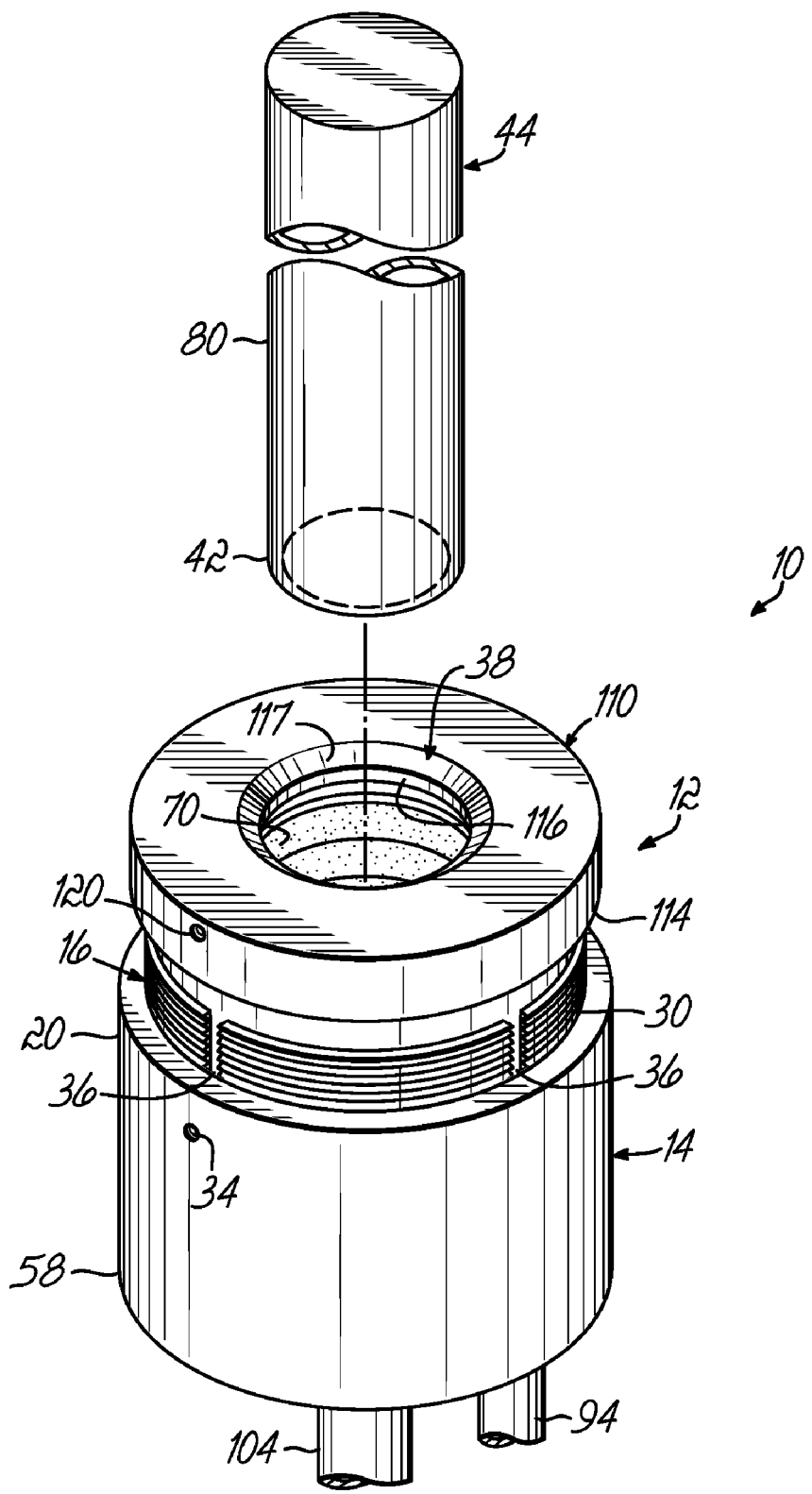
FIG. 2 is an assembled perspective view of the fitting of FIG. 1.
Figure 3A:
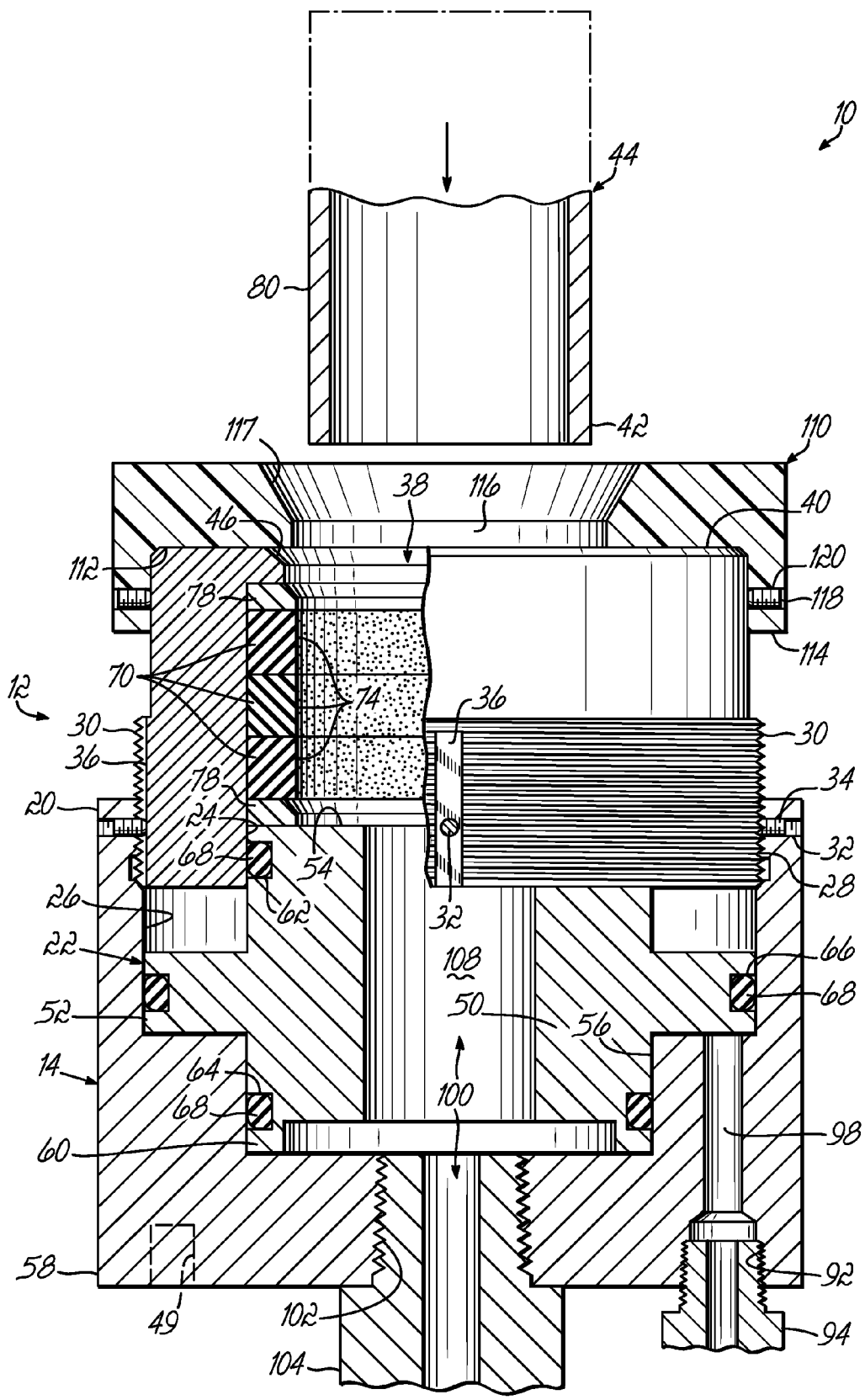
FIG. 3A is a cross-sectional view of the fitting of FIG. 1.

FIGS. 1, 2 and 3A depict an exemplary fitting in accordance with the principles of the present invention for quick and easy coupling to the inlet of a piping system or container to facilitate filling the system or container with fluid. The fitting 10 includes a housing 12 having a base 14 and a closure 16 coupled to the base 14. In the embodiment shown, the base 14 comprises a generally cylindrical body having a recess 18 formed into a first end 20 for receiving a piston 22, as will be described in more detail below. The closure 16 also has a generally cylindrical shape and has a corresponding recess 24 formed into a lower portion thereof, whereby the base 14 and closure 16 define an internal cavity 26 within housing 12 when coupled together. In the embodiment shown, base 14 includes internal threads 28 formed at the open first end 20. The closure 16 is received within the open first end 20 of base 14 and includes externally formed threads 30 corresponding to the internal threads 28 of the base 14, whereby the closure 16 and housing 14 may be threadably coupled together. While base 14 and closure 16 are depicted as having generally cylindrical shapes, it will be recognized that base 14, closure 16, and the various other structures shown and described herein may have various other shapes, and the invention is not limited to the embodiments depicted herein.

When closure 16 is threaded a desired distance into base 14, the relative positions of the closure 16 and base 14 may be locked to prevent inadvertent movement of the closure 16 relative to the base 14. In the embodiment shown, a plurality of set screws 32 are threadably adjustably inserted within a corresponding plurality of radially extending threaded holes 34 spaced circumferentially around base 14, adjacent the first end 20. When the closure 16 is threaded a desired distance into the base 14, set screws 32 may be adjusted inwardly to engage the closure 16. To prevent damage to the exterior threads 30 formed on the closure 16, a plurality of axially extending slots 36 are formed on the closure 16 and across the threads 30 to provide engagement surfaces for clamping the set screws 32 against the closure 16. Accordingly, the plurality of slots 36 may be aligned with the set screws 32 prior to tightening the set screws 32 to engage the closure 16.

An aperture 38 is formed in the top wall 40 of the closure 16 and is sized to admit an inlet end 42 of a pipe system 44 into the interior cavity 26 through the closure 16. The aperture 38 may include a beveled edge 46 to facilitate directing the inlet end 42 of the pipe system 44 through the aperture 38. Axially extending holes 48 may also be formed in top wall 40 to facilitate threading closure 16 into base 14, using a spanner wrench for example. Similar axially extending apertures 49 (FIG. 3A) may be formed in the base 14 to facilitate threadably coupling closure 16 and base 14 using a spanner wrench.

Fitting 10 further includes a piston 22 slidably disposed within the interior cavity 26 of the housing 12. In the embodiment shown, the piston 22 comprises a generally cylindrical body 50 and a flange portion 52 extending generally radially outwardly from the tubular body 50. A first end 54 of the piston 22 is received within the recess 24 formed in the closure 16. The recess 18 in the housing 14 has a narrowed portion 56 toward the second end 58 of the housing 14 that is sized to receive the second end 60 of the piston 22. Generally circumferentially extending grooves 62, 64, 66 are formed on the first and second ends 54, 60 of the piston 22 and on the radially extending flange 52 for receiving O-rings 68 that seal piston 22 against the portions of base 14 and closure 16 that define the interior cavity 26.

One or more resilient bushings 70 are disposed within the interior cavity 26 of the housing 12 between the closure 16 and the piston 22. Resilient bushing 70 may be formed from polymeric material, such as Neoprene, or other materials suitable for sealing against an inlet to a pipe system or a container, and which is suitable for use with the fluids that will be used to fill the pipe systems or containers. In the embodiment shown, the outer circumference 72 of each bushing 70 is sized to fit within the recess 24 in the closure 16. Inner diameters 74 of the bushings 70 are aligned with the aperture 38 formed in the top wall 40 of the closure 16 and are sized to receive an end 42 of the inlet 44 to a pipe system or container therethrough. In the embodiment shown, three bushings 70 are provided within the interior cavity 26 in a generally stacked arrangement. It will be recognized, however, that a single bushing, two bushings, or more than three bushings may alternatively be used in accordance with the principles of the present invention.

Figure 3B:
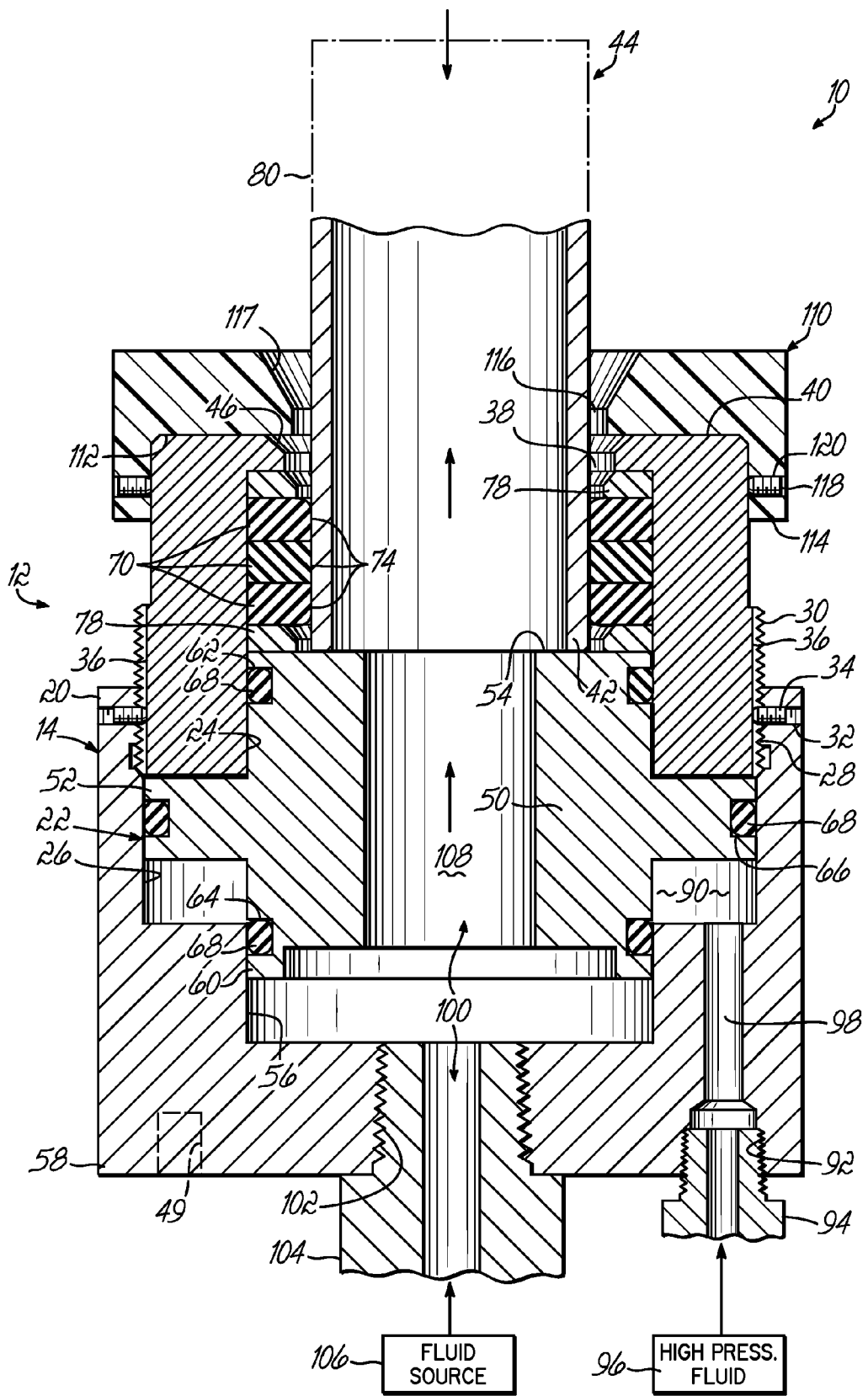
FIG. 3B is a cross-sectional view of the fitting of FIG. 1, similar to FIG. 2, and depicting an inlet pipe or conduit sealingly engaged by the fitting.

FIG. 3A depicts a first condition of the fitting 10 wherein the resilient bushings 70 are generally uncompressed so that the end 42 of the inlet 44 may be easily inserted through the aperture 38 of the closure 16 and into the interior cavity 26 of the housing 12. When the end 42 of the inlet 44 is in position, the fitting 10 may be actuated to a second condition, depicted in FIG. 3B, wherein the piston 22 is moved in a direction toward the closure 16 to axially compress the resilient bushings 70 against the closure 16. To facilitate axial compression of the resilient bushings 70, compression washers 78 may be provided adjacent upper and lower ends of the bushing or bushings 70. As the bushings 70 are axially compressed by the piston 22, the unconstrained inner diameters 74 of the bushings 70 are caused to expand radially inwardly toward the outer surface 80 of the inlet 44. Compression of the resilient bushings 70 continues until the resilient bushings 70 sealingly engage the outer surface 80 of the inlet 44.

In the embodiment shown, piston 22 is actuated by pneumatic or hydraulic pressure applied to one side of the radially extending flange 52. A variable volume space 90 (FIG. 3B) is therefore defined on one side of the radial flange 52, between the piston 22 and the interior cavity 26. A first port 92 formed in the housing 12 is configured to accommodate a fitting 94 for coupling the first port 92 to a source of pressurized fluid 96. A fluid passageway 98 extends between the first port 92 and interior cavity 26 whereby the pressurized fluid may be admitted to and withdrawn from the interior cavity 26 to thereby actuate the piston 22 for movement toward and away from the closure 16. When the fluid pressure within the variable volume space 90 is relieved, movement of piston 22 in a direction away from closure 16 may be facilitated by expansion of the resilient bushings 70 as they return to their generally uncompressed states. While the bushings 70 have been shown and described as being generally uncompressed in the first condition of the fitting 10 (FIG. 3A), it will be recognized that the bushings 70 may be alternatively be pre-compressed by the closure 16 when the closure 16 is threadedly coupled to the base 14.

With the end 42 of the inlet 44 inserted within the interior cavity 26 and sealingly engaged by the resilient bushings 70 in the second condition of the fitting 10 (FIG. 3B), fluid may be supplied to the inlet 44 to fill the pipe system or container. To this end, a fluid passage 100 is provided through the housing 12 to the inlet end 42 of the pipe system 44. In the embodiment shown, a second port 102 is formed in the base 14 and communicates with the interior cavity 26. The second port 102 is configured to accommodate a fitting 104 for coupling the housing 12 to a source of pressurized fluid 106, which may be a gas or a liquid. Fluid is admitted into the interior cavity 26 of the housing 12 through the second port 102 and enters the end 42 of the inlet 44, via a bore 108 through the piston 22. When it is desired to test the seal integrity and pressure capability of a pipe system, fluid from source 106 may be pressurized and the system monitored by pressure gages or leak testing equipment, such as any of the various monitoring and detection systems available from Cincinnati Test Systems, Inc. of Cincinnati, Ohio.

After a container has been filled, or after a pipe system has completed leak testing, the flow of fluid from source 106 to the second port 102 may be shut off, such as by a valve (not shown). The supply of pressurized fluid to the first port 92 may then be shut off, whereafter the piston 22 is caused to move in a direction away from the closure 16, to release the resilient bushings 70 from the compressed state. The inlet 44 may then be withdrawn from the interior cavity 26 and inlet 44 of a different container or pipe system may thereafter be inserted through the aperture 38 in the closure 16 and through the inner diameters 74 of the resilient bushings 70 into the interior cavity 26 of the housing 12. The second pipe system 44 may then be filled and/or tested in the same manner described above.

Resilient bushings 70 can be removed and replaced with similar bushings having differently sized inner diameters 74, whereby the fitting 10 can be quickly adapted for to fill and/or test pipe systems or containers having differently sized inlets 44. When it is desired to fill and/or test a pipe system or container having a differently sized inlet 44, closure 16 may be removed from the base 14 to facilitate replacing the resilient bushings 70 with one or more differently sized resilient bushings 70 configured to engage the outer surface 80 of the differently sized inlet 44 in a manner described above. Housing 12 may therefore be used with a plurality of differently sized bushings 70 to accommodate filling and/or testing various containers or piping systems with differently sized inlets 44.

In another embodiment of the invention, the fitting 10 may further include a protective cover 110 adjacent the aperture 38 in the top wall 40 of the closure 16 to facilitate directing the inlet 44 into the fitting 10 and to prevent marring or otherwise damaging the surfaces of the closure 16 and/or inlet 44 by inadvertent contact with the closure 16. In one embodiment, the protective cover 110 is formed from ultra-high molecular weight polymeric material, however, it will be recognized that various other materials suitable for coupling to the closure 16 and protecting the fitting 10 from inadvertent contact with the inlet 44 may be used. In the embodiment shown, the cover 110 has a generally cylindrical shape and includes a recess 112 (FIG. 3B) formed into a lower surface 114 thereof. The recess 114 is sized to be frictionally fit over the closure 16, adjacent the aperture 38 in the top wall 40. Cover 110 further includes an aperture 116 therethrough and generally sized to correspond to the size of the aperture 38 through the closure 16. The aperture 116 in the cover 110 may include a taper 117 to facilitate inserting the inlet 44 into the fitting 10. Cover 110 may be further secured to closure 16 by one or more set screws 118 installed through threaded holes 120 provided around the circumference of the cover 110.

Figure 4A:
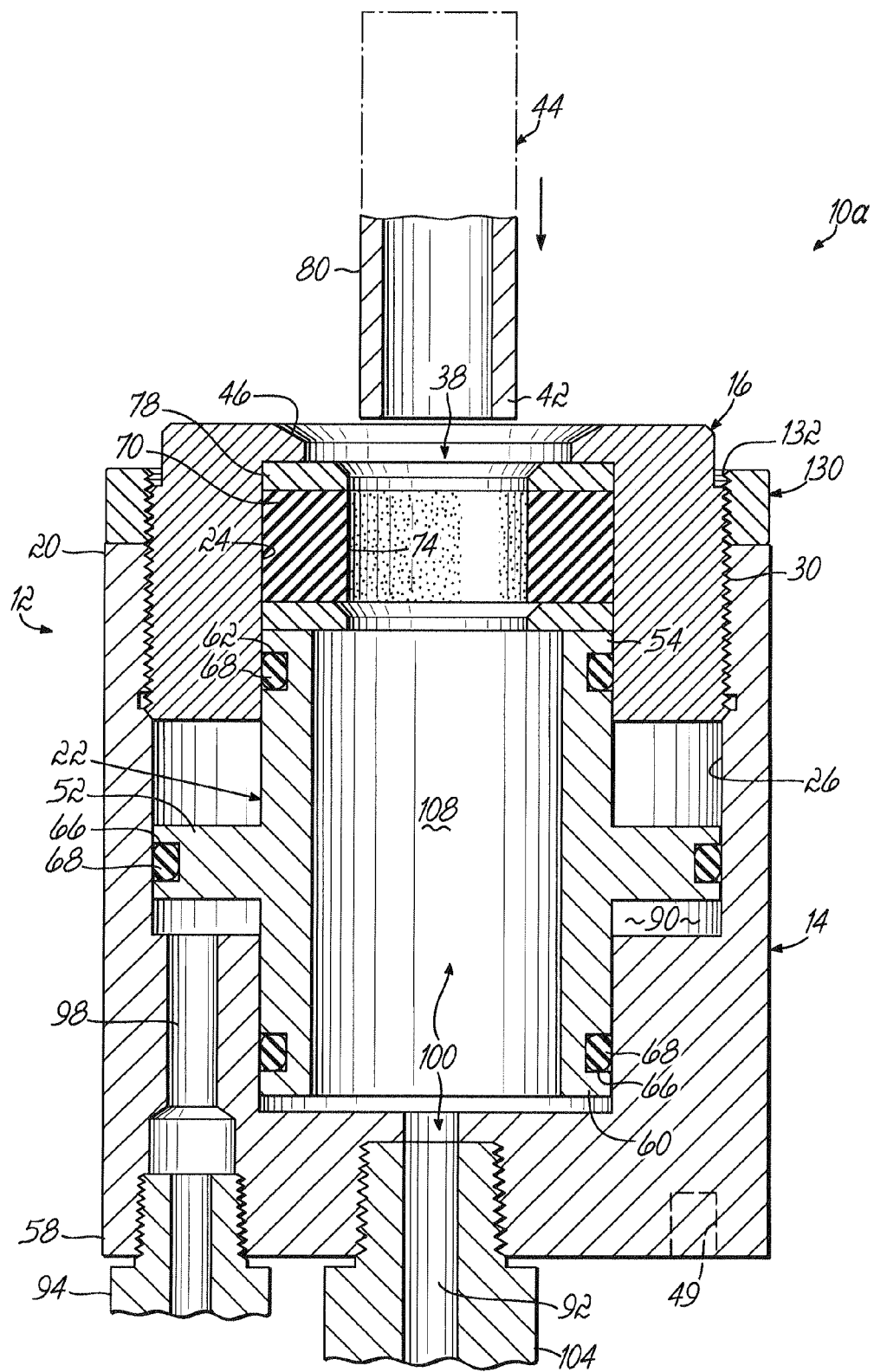
FIG. 4A is a cross-sectional view depicting another exemplary fitting in accordance with the principles of the present invention.
Figure 4B:
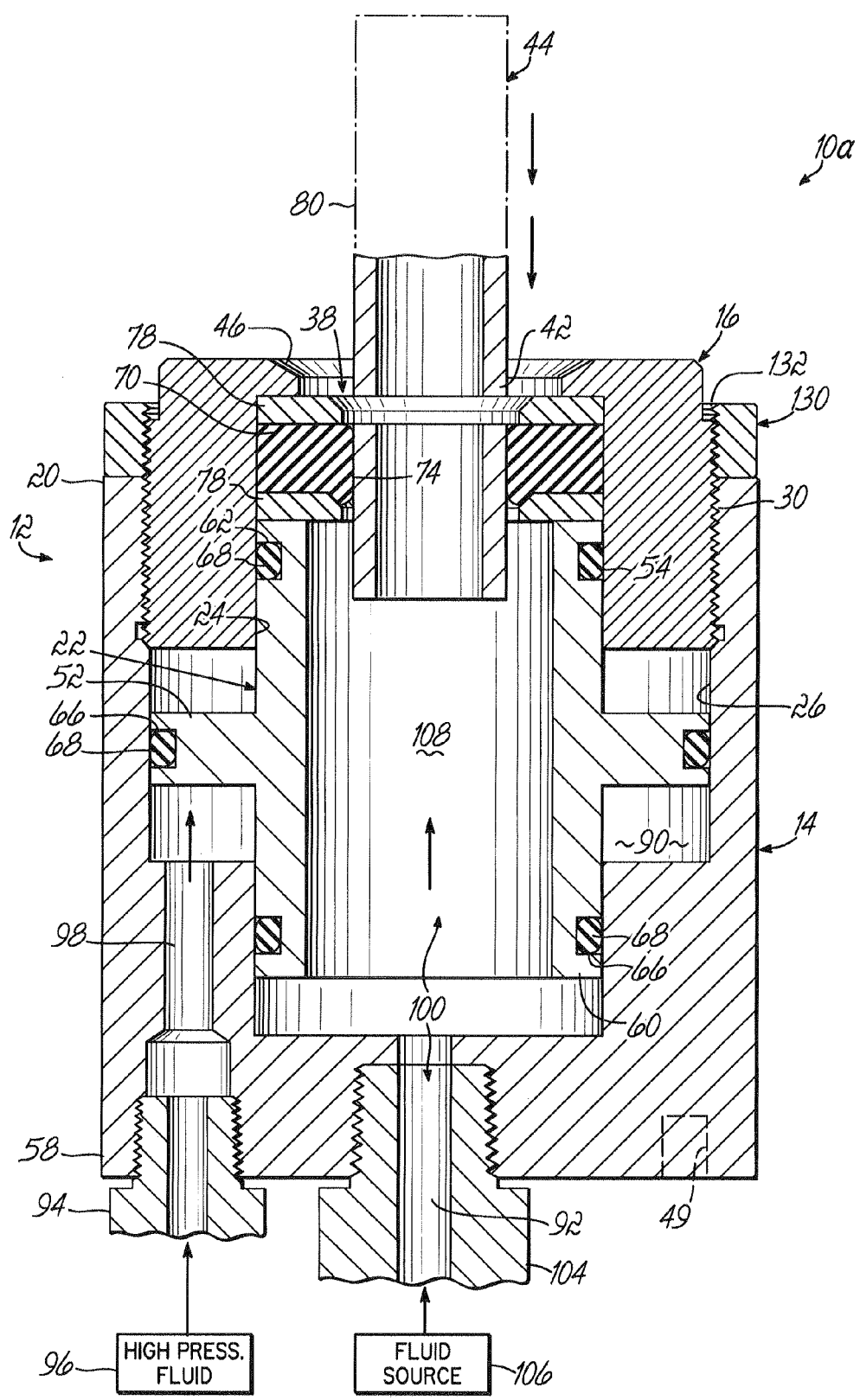
FIG. 4B is a cross-sectional view of the fitting of FIG. 4A, depicting an inlet pipe or conduit sealingly engaged by the fitting.

FIGS. 4A and 4B depict another exemplary fitting 10a in accordance with the principles of the present invention. Fitting 10a is similar to the fitting 10, shown and described above with respect to FIGS. 1, 2, 3A and 3B, and like components are similarly numbered. To lock closure 16 in position on base 14, fitting 10a includes a locking ring 130 instead of set screws 32. The generally annularly-shaped locking ring 130 is sized to be received over the closure 16 and is threadably secured to the closure 16 by internal threads 132 corresponding to the external threads 30 formed on the closure 16. Locking ring 130 may be threadably adjusted to abut the first end 20 of the base 14 when the closure 16 is positioned at a desired location within the base 14. The locking ring 130 may thus be tightened against the first end 20 of the base 14, without the use of tools, to prevent further movement of the closure 16 relative to the base 14.

The fitting 10a shown in FIGS. 4A and 4B illustrate an embodiment wherein a single resilient bushing 70 is used to seal against the outer surface 80 of inlet 44. FIG. 4A depicts the fitting 10a in a first condition, with the resilient bushing 70 in a generally uncompressed state. FIG. 4B depicts the fitting 10a in a second condition with the piston 22 actuated in a direction toward the closure 16 to thereby axially compress the resilient bushing 70 as described above with respect to fitting 10. The unconstrained inner diameter 74 of the bushing 70 expands radially inwardly to sealingly engage the outer surface 80 of the inlet 44 stem, as discussed above.

Fittings in accordance with the principles of the present invention, such as those shown and described herein, can be quickly and easily connected to an inlet of a pipe system or a container to sealingly engage the inlet and permit filling and/or leak testing thereof. The inlet is firmly secured to the fitting 10, 10a by the resilient bushings 70, without the need for collets or other mechanical devices that present risks of marring or otherwise damaging the inlet.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A fitting for sealingly engaging an inlet having an outer surface, the fitting comprising:
    a housing comprising a base and a closure;
    said closure having a first aperture for receiving the inlet therethrough;
    said base and said closure threadably coupled together to define a cavity within said housing;
    a piston disposed within said cavity for sliding movement therein;
    a resilient bushing disposed in said cavity between said closure and said piston, said resilient bushing having an inner diameter aligned with said first aperture;
    a fluid passage through said housing for providing fluid to the inlet when the inlet is coupled to the fitting; and
    a locking member threadably coupled to said housing and configured to prevent damage to said base and said closure;
    the fitting having a first condition wherein the inlet can be received within said inner diameter of said bushing, and having a second condition wherein said piston axially compresses said resilient bushing against said closure and said resilient bushing radially expands to engage the outer surface of the inlet;
    wherein said locking member comprises an annular ring adjustably threadably coupled to said closure and abutting said base in a locked condition of the fitting.

2. The fitting of claim 1, wherein said piston is completely disposed within said cavity of said housing.

3. The fitting of claim 1, wherein said piston is actuated by pressurized fluid to compress said resilient bushing against said closure in said second condition.

4. The fitting of claim 1, further comprising:
    a variable volume space in said housing and defined between said piston and said cavity; and
    a first port communicating with said variable volume space;
    said piston actuated to compress said resilient bushing against said closure in said second condition when said variable volume space is exposed to pressurized fluid through said first port.

5. The fitting of claim 4, further comprising a second port in said housing and communicating with said fluid passage.

6. The fitting of claim 1, further comprising:
    a radially extending flange on said piston; and
    a sealing member on an outer peripheral portion of said flange for sealingly engaging said cavity within said housing.

7. A fitting for sealingly engaging an inlet having an outer surface, the fitting comprising:
    a housing comprising a base and a closure;
    said closure having a first aperture for receiving the inlet therethrough;

said base and said closure threadably coupled together to define a cavity within said housing;

a piston disposed within said cavity for sliding movement therein;

a resilient bushing disposed in said cavity between said closure and said piston, said resilient bushing having an inner diameter aligned with said first aperture;

a fluid passage through said housing for providing fluid to the inlet when the inlet is coupled to the fitting;

a locking member threadably coupled to said housing and configured to prevent damage to said base and said closure;

the fitting having a first condition wherein the inlet can be received within said inner diameter of said bushing, and having a second condition wherein said piston axially compresses said resilient bushing against said closure and said resilient bushing radially expands to engage the outer surface of the inlet;

a plurality of grooves on said closure; and a threaded aperture formed into said base;

wherein said locking member comprises a threaded fastener threadably adjustable within said threaded aperture of said base and engaging one of said grooves in a locked condition of the fitting.

8. The fitting of claim 7, further comprising:

a protective cover extending over at least a portion of said closure and having an aperture formed therethrough, said aperture aligned with the first aperture of said closure.

9. The fitting of claim 8, wherein said aperture through said cover is tapered to facilitate receiving the inlet therethrough.

10. The fitting of claim 7, wherein said piston is completely disposed within said cavity of said housing.

11. The fitting of claim 7, wherein said piston is actuated by pressurized fluid to compress said resilient bushing against said closure in said second condition.

12. The fitting of claim 7, further comprising:

a variable volume space in said housing and defined between said piston and said cavity; and a first port communicating with said variable volume space;

said piston actuated to compress said resilient bushing against said closure in said second condition when said variable volume space is exposed to pressurized fluid through said first port.

13. The fitting of claim 12, further comprising a second port in said housing and communicating with said fluid passage.

14. The fitting of claim 7, further comprising:

a radially extending flange on said piston; and a sealing member on an outer peripheral portion of said flange for sealingly engaging said cavity within said housing.

* * * * *